Figure 1:
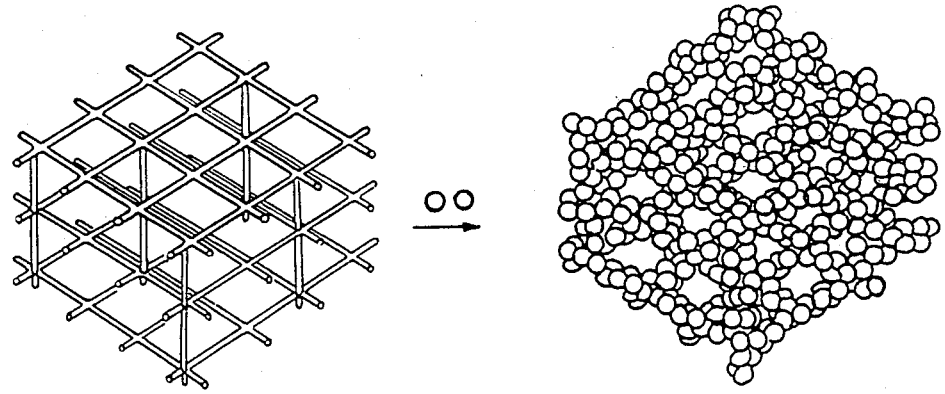

United States Patent [19]

von Blücher et al.

[11] Patent Number: 4,906,263

[45] Date of Patent: Mar. 6, 1990

[54] ADSORPTION FILTER WITH HIGH AIR PERMEABILITY

[76] Inventors: Hasso von Blücher, Columbusstrasse 58, D-4000 Düsseldorf 1; Ernest De Ruiter, Höhenstrasse 57a, D-5090 Leverkusen 3, both of Fed. Rep. of Germany

[21] Appl. No.: 340,954

[22] Filed: Apr. 20, 1989

[30] Foreign Application Priority Data

Apr. 22, 1988 [DE] Fed. Rep. of Germany ....... 3813563

[51] Int. Cl.$^4$ .............................................. B01D 53/02
[52] U.S. Cl. ....................................... 55/316; 55/387; 55/477; 55/524; 55/74; 55/DIG. 13
[58] Field of Search .................... 55/74, 75, 208, 316, 55/387, 389, 477, 524, DIG. 13

[56] References Cited

U.S. PATENT DOCUMENTS 3,018,845 1/1962 Powers ............................ 55/524 X
3,217,715 11/1965 Berger et al. ..................... 55/387 X
3,338,034 8/1967 Hemstreet ......................... 55/389 X
3,713,281 1/1973 Aske et al. ............................. 55/387

*Primary Examiner*—Charles Hart
*Attorney, Agent, or Firm*—Sprung Horn Kramer & Woods

[57] ABSTRACT

The adsorption filter has a highly air-permeable, three-dimensional carrier framework essentially stable in shape, to which a layer of granular adsorber particles with a diameter of 0.1 to 1 mm is affixed. The carrier framework can be composed of wires, monofilaments or stays, the distance between them being at least twice as great as the diameter of the adsorber particles. The carrier framework can also be a large-pore reticulated polyurethane foam which has a weight of 20 to 60 g/l and pores with a diameter of 1.5 to 3 mm. In spite of a very slight pressure drop, the filter performance is excellent.

24 Claims, 2 Drawing Sheets

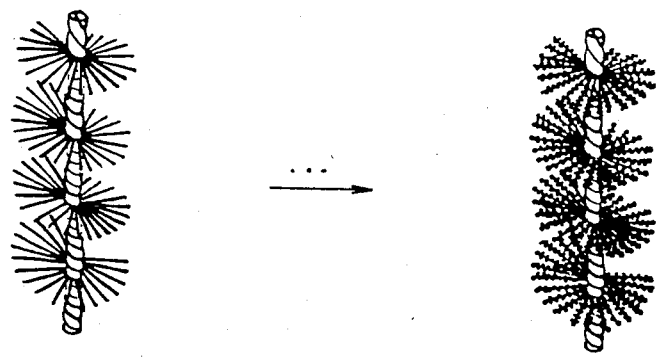
FIG.3
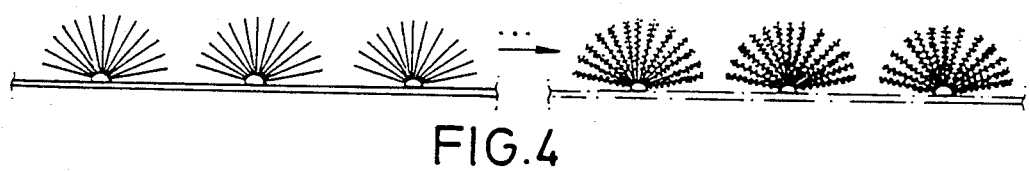
FIG.4
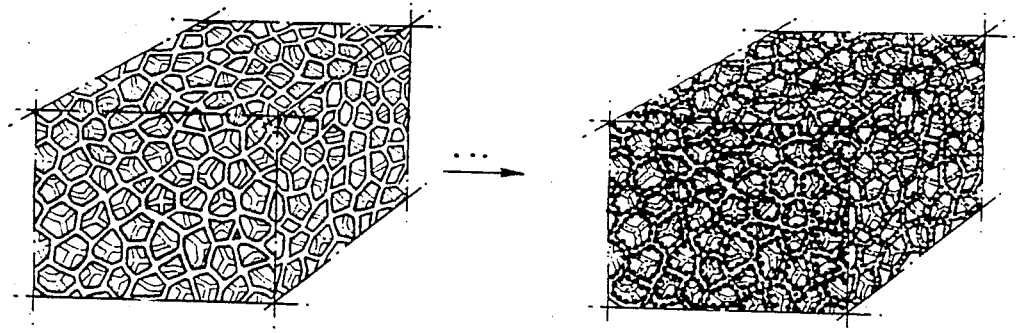
FIG.5
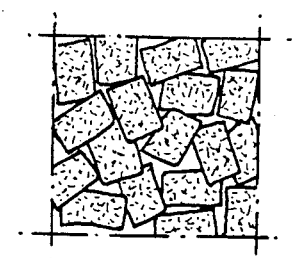

ADSORPTION FILTER WITH HIGH AIR PERMEABILITY

A preferred means for removing undesirable substances from gases or liquids is an adsorption filter. A kind of filter which is often used is a bulk filter, in which the medium to be purified flows through a fixed bed of adsorber particles.

In order to guarantee a sufficient period of functioning of the filter, a sufficient amount, i.e. mass of the adsorber material, must be present. At the same time, however, the adsorption kinetics are proportional to the available "external" surface of the particles, so that small particles are advantageous in this connection. In addition, larger adsorber particles can often be fully utilized only in their outer areas. These are usually already saturated—requiring an interruption of adsorption and desorption in between—while the charcoal is only slightly charged on the inside. The use of the smallest possible particles in a bulk filter, however, necessarily leads to a high pressure drop. For practical purposes, the particle size is limited in a downward direction by the pressure drop related to it. A further disadvantage of bulk filters is that abrasion phenomena occur as a result of the adsorber particles rubbing against each other, and that the charcoal in powder form increases the flow resistance even more.

In general, the opinion is that good filter performance necessarily requires high flow-through resistance, because only then can there be good contact between the gas to be purified and the adsorber grains. In order to also preclude break-throughs across cavities which form when particles settle, the packing must be firmly compressed. In this way, high flow-through resistance of the bulk filters is pre-programmed.

It is therefore the object of the present invention to avoid the disadvantages of conventional bulk filters composed of adsorber particles and to create an adsorption filter with low flow-through resistance and high adsorption performance.

The solution according to the invention is an adsorption filter with a highly air-permeable, three-dimensional carrier framework essentially stable in shape, formed of wires, monofilaments or stays, to which a layer of granular, particularly spherical adsorber particles with a diameter of 0.1 to 1 mm is affixed, with the distance between the wires, monofilaments or stays being at least twice as great as the diameter of the adsorber particles. Preferably, it is approximately three to ten times as great. Accordingly, the openings or pores of the carrier framework have a diameter of 1 to 5 mm, preferably 1.5 to 2.5 mm. The diameter of the wires of which the carrier framework can be structured is preferably 0.1 to 0.8 mm. If the highly air-permeable, three-dimensional carrier framework, essentially stable in shape, is composed of monofilaments or threads of plastic, glass or liquefied minerals, the diameter is preferably 0.2 to 1 mm.

The invention will be further described with reference to the accompanying drawings, wherein FIGS. 1 to 5 are views of different carrier frameworks in accordance with the invention, before and after application thereto of adsorber particles.

More specifically, the carrier framework can consist of wire netting or wire mesh with a mesh width of 1 to 5 mm, preferably 1.5 to 2 mm, superimposed in layers, between which spacers with approximately the same length as the diameters indicated are located. Such a carrier framework is shown in FIG. 1, magnified approximately five times, without and with adsorber particles affixed to it.

Figure 2:
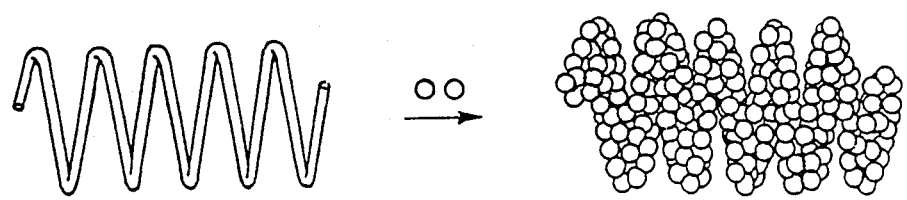

Another carrier framework which is very useful for the purposes of the invention consists of plastic or wire spirals with a length equal to and up to approximately ten times their diameter. For example, monofilaments of thermoplastic synthetics with a diameter of 0.2 to 1 mm can easily be produced using usual means, e.g. by wrapping them around a mandrel with the desired inclination. The elasticity is sufficient to strip such a spiral from the mandrel by compressing it, after it has solidified and been cut to the desired length. Such carrier structures in the shape of a spiral generally have a diameter of 0.3 to 10 mm and a length equal to and up to approximately ten times that. Such a carrier structure, without and with adsorber particles affixed to it, is shown in FIG. 2, magnified approximately three times.

Wires or monofilaments with a length of 2 to 10 mm, which are held together by twisted metal wires or plastic monofilaments and then project perpendicular from this axis in the shape of a spiral staircase, are also very useful carrier structures for the purposes of the invention. Such structures are produced in various sizes as test tube or bottle brushes. For the purposes of the invention, they are then cut to a length of several centimeters, e.g. 1 to 10 cm. Filter elements made of this carrier structure are shown in FIG. 3.

Furthermore, tree-shaped fiber brushes are commercially available, whose fibers, with a length of 1 to 10 mm, radiate out from a center point and are generally attached on a yarn or monofilament, from which they can be removed after being charged with the adsorber particles, e.g. with a suede cutting machine, for the purposes of the invention. Such carrier structures are shown in FIG. 4.

A preferred embodiment of the carrier framework is a large-pore reticulated PUR foam with a liter weight of 20 to 60 g and pores with a diameter of 1.5 to 4 mm. Such foams are produced in known manner by first evacuating a large open-pore foam block located in a closed chamber. Then an explosive gas mixture is allowed to flow in and is then ignited. The cell walls are destroyed by the explosion and melt to form stays. Therefore reticulated foams do not have walls, but rather consist of a grid of stays, which form cages with a diameter of about 1 to 5 mm. These "foams" are elastic, can be easily compressed by hand, even at a thickness of several centimeters, and then resume their original shape. When they are completely covered with adsorber beads or grains, as shown in FIG. 5, they are relatively rigid and can no longer be compressed with the same amount of force.

The reticulated foams can already possess the optimal thickness required for production or for use as a filter layer. If this thickness is only several centimeters, the open-pore structure permits them to be coated with adsorber beads or grains also on the inside, and they can have the desired shape of the filter layer directly, or this can be punched out of a larger plate. It is also possible to subsequently cut up these plates to form elementary filters in the form of strips or chips, with a size of approximately a few cubic centimeters. This results in complete independence from the shape of the objects to be filled, as is also the case for the spirals, fiber brushes or "bottle brushes" described as carrier structures. The various elementary filters can be placed in the cavities to be filled, together with heterophilic fibers or threads of hot-melt glue. The entire assembly can be solidified after filling, so that even under great mechanical stress, there is no risk of settling or abrasion, as is the case with bulk filters.

The possibilities of carrier structures for adsorption filters as described are not to be viewed as limiting. A person skilled in the art can easily think of other carrier frameworks which can be produced with the known methods of metal or plastics processing, in a cost-effective manner, and which might even occur as waste products. The highly air-permeable three-dimensional carrier frameworks are supposed to be essentially stable in shape on the basis of the thickness or the strength of the wires, monofilaments or threads of which they are composed, i.e. they should not simply collapse, but can certainly be elastic, so that they can be compressed to a certain extent, but then resume their original shape. When the granular, especially spherical adsorber particles are affixed to them and these carrier frameworks are preferably completely covered with the adsorber particles, the rigidity is increased and the filter elements, i.e. the entire adsorber filter layers, are then relatively rigid, pressure-resistant structures.

Depending on the material of which the carrier framework is formed, the adsorber particles can be affixed to it directly, or an adhesive mass is required. Plastic materials, particularly fiber materials, are commercially available, which have the property of first becoming sticky on the surface at an elevated temperature, within a certain temperature interval, without melting. This property, which could be designated as a built-in hot-melt glue, can be utilized to affix the adsorber particles to them. Such fibers can be heterophilic fibers made of two coaxially arranged components, the outer one of which demonstrates a lower melting point. Unstretched amorphous polyester fibers which become soft and sticky at approximately 80° to 85° C., without melting, and subsequently crystallize at higher temperatures and then have the thermal stability of a normal polyester fiber, are also suitable. Such fibers with adsorbents affixed to them are described for textile surface filters, for example in DE-AS-32 00 959.

Another possibility preferred for the purposes of the invention is to affix the adsorber particles to the carrier framework with an adhesive mass. With this alternative, a person skilled in the art has a greater choice with regard to the material of which the carrier framework is made, as well as with regard to the adhesive mass.

With both possibilities, the diameter of the wires, monofilaments or stays of the surface structure alone or with the adhesive mass is dimensioned in such a way that complete coverage of the carrier structure with the adsorber particles is possible, in order to produce a carrier framework, i.e. a filter element completely covered with the adsorber particles, in a preferred embodiment of the invention.

An adsorption filter according to the invention can also be produced in the following manner:

The adsorber particles are preferably affixed continuously on the fibers or monofilaments which become sticky on the surface when heated as described, or on continuous wires or monofilaments which have been coated with an adhesive mass, and these carriers charged with adsorber beads are cut up into small pieces with a length of 0.5 to 3 cm. These carriers can, in addition to being straight, also be sine-shaped or zigzag-shaped, in order to result in an even more open structure. When cut up, or later, and possibly in combination with heterophilic fibers or threads of hot-melt glue, an adsorption filter with the desired thickness can be formed as an irregular structure of the wires or monofilaments coated with the adsorber particles, and preferably be compacted or welded in a mold or in the intended container for the filter, possibly by being heated.

In order to fix the adsorber particles on the carrier, both inorganic and organic adhesive systems can be used. The latter include polymers, particularly acrylic acid derivatives, polyurethanes, polystyrenes, polyvinyl acetates as well as hot-melt glues. Those masses which consist of polymers which can be cross-linked, which pass through a viscosity minimum before being cross-linked, are preferred. Such adhesive systems, such as IMPRANIL(R)-High-Solid-PUR reactive products from BAYER(R), are highly viscous at first, i.e. they offer good initial adhesion when the carrier framework is being covered with the adsorber particles. With an increase in temperature, they demonstrate a great decrease in viscosity, which results in better wetting of the adsorber particles and therefore especially good adhesion after hardening, due to cross-linking. When the viscosity minimum is reached, small constrictions form at the contact sites between the carrier framework and the adsorber particles, due to capillary forces. Because the adsorber beads are practically attached at only one point, almost their entire surface is accessible to the gas to be cleaned after hardening.

When using metallic or ceramic carriers, adhesive masses of enamel or glazes can be used; in this case, the work has to be carried out in an inert atmosphere, due to the high temperatures required to melt these coatings, so that the effectiveness of the adsorber particles is not impaired or destroyed by oxidation.

The adsorber particles must be pourable and abrasion-resistant. It is most practical if their diameter is three to five times smaller than the diameter of the pores or openings of the highly air-permeable carrier framework. Commercially available adsorber beads with a diameter of 0.1 to 1 mm are not only the most easily pourable form, but also withstand the greatest stress, due to their symmetry. Granular adsorber particles are also suitable, however, as long as they are not too angular or too irregular in their shape, because it is important that the adsorber particles can still penetrate into structures with a thickness of several centimeters when they are affixed on their surface structure.

The adsorber grains can consist of organic or inorganic initial materials and demonstrate deposition spaces for additives such as heavy metal catalysts, flame inhibitors, antibacterial as well as fungicidal substances. In general, they should be as pressure-resistant as possible.

The structure and the production of suitable adsorber grains, although not in the particle size required for the purposes of this invention, are described in detail in DE-B-28 04 154. These adsorber grains demonstrate a relatively closed external surface, but are porous in total, so that the area which is available for adsorbing substances is extraordinarily great.

For example, diatomite can be used as the material for the adsorber grains; it might already have the required grain shape. But in order to achieve an especially good filter effect, it is particularly advantageous for the adsorber grains to be formed of activated charcoal. The adsorbers can be molecular screens or based on silicic acid, they can consist of highly porous materials saturated with chemicals, or carry substances with a catalytic effect, such as metal compounds, for example.

Suitable activated charcoal particles should have an internal surface of 600 to 2000 $m^2/g$, preferably 1000 to 1600 $m^2/g$ determined according to the BET method. The activated charcoal particles should be very pressure-resistant and preferably highly resistant to moisture. A very abrasion-resistant spherical activated charcoal can be produced, for example, from coal tar pitch or petroleum distillation residues. Additional hardening of the surface as well as noteworthy moisture resistance can be achieved with special post-treatment. The production of suitable activated charcoal beads is described, for example, in EP-B-118 618, DE-B-29 32 571 and DE-A-30 41 115.

In order to increase the abrasion resistance, the activated charcoal can also be impregnated at its surface in a plastic dispersion or a coal tar pitch solution or bitumen solution, and subjected to slight post-activation. The sensitivity with regard to steam can be significantly reduced by adding ammonia gas during post-activation and cooling to 100° C. with exclusion of air.

The activated charcoal particles can be impregnated with metal compounds, particularly compounds of the metals silver, copper and chrome. In addition, encapsulated enzymes which decompose poisons, as described in EP-B-118 618, can also be present.

With the filters described, excellent separation effects for pollutants and gases were achieved at extremely low pressure drops. It was surprisingly shown that it is not necessary for flow to go through the adsorber grains, but rather only past them, in order to achieve high effectiveness with a low pressure drop. The Brownian motion of the gas molecules is sufficient to achieve a high adsorption velocity. The pressure drop of an adsorption filter according to the invention is less than 10 mm, preferably less than 5, and especially less than 2 mm water column at a thickness of 4 cm with a circular cross-section of 100 cm2 when an air flow of one liter per second flows through it. A loosened adsorption filter layer according to the invention has a greater volume than a bulk filter, with the same performance, but significantly lower flowthrough resistance.

EXAMPLE 1

Ten wire grids, 50×60 cm, mesh width 2 mm, wire thickness 0.30 mm, were formed into a package with a height of approximately 4 cm using steel tubes with a thickness of 2 mm as spacers, and dipped into a mixture consisting of a "masked" pre-polymer polyurethane (Bayer HS 62), an emulsifier (Bayer HS DW), a cross-linker (Bayer HS C) and water. The viscosity (approximately 2000 mP.s) was adjusted in such a way that it was easy to shake off the excess adhesive and the three-dimensional framework was coated with 440 g adhesive. This was placed in a large bowl and a molecular sieve in spherical form (diameter 0.4–0.6 mm) was poured over it. Approximately 3 kg adsorber remained in the framework. The adhesive layer was cross-linked by increasing the temperature to 170° C. The molecular sieve beads were fixed very firmly, but only at one point, on the carrier framework. In order to measure the air permeability, an area of approximately 100 cm2, sealed laterally, was subjected to an air flow of 1 l/sec. The pressure drop was less than 2 mm water column.

EXAMPLE 2

The carrier framework used was a large-pore, reticulated polyurethane foam, 4 cm thick, with a liter weight of 80 g and a pore diameter of 2.5–3 mm. This foam was squeezed with the same adhesive mass as in Example 1 (adhesive application, dry 55 g/l), charged with molecular sieve beads as in Example 1 (approximately 260 g/l) and finally heated to 170° C. for a short time. This resulted in a filter material with a very slight pressure drop (approximately 1 mm water column at 1 l/sec on 100 cm2). The adsorptive properties approximately corresponded to those of Example 1.

It will be understood that the specification and examples are illustrative but not limitative of the present invention and that other embodiments within the spirit and scope of the invention will suggest themselves to those skilled in the art.

What is claimed is:

1. An adsorption filter with high air permeability, comprising a highly air-permeable, three-dimensional carrier framework essentially stable in shape, formed of wires, monofilaments or stays, to which a layer of granular, adsorber particles with a diameter of about 0.1 to 1 mm is affixed, the distance between the wires, monofilaments or stays being at least twice as great as the diameter of the adsorber particles.

2. An adsorption filter according to claim 1, wherein the openings or pores of the carrier framework have a diameter of about 2 to 4 mm.

3. An adsorption filter according to claim 1, wherein the diameter of the wires, monofilaments or stays of the carrier framework is such that there is complete coverage of the carrier framework with the adsorber particles affixed to it.

4. An adsorption filter according to claim 1, wherein the carrier framework is completely covered with the adsorber particles.

5. An adsorption filter according to claim 1, wherein the adsorber particles are affixed to the carrier framework with an adhesive mass.

6. An adsorption filter according to claim 5, wherein the adhesive mass is a polymer of an acrylic acid derivative, a polyurethane, a polystyrene, a polyvinyl acetate or a hot-melt glue.

7. An adsorption filter according to claim 5, wherein the adhesive mass comprises a polymer which can be cross-linked and which passes through a viscosity minimum before being cross-linked.

8. An adsorption filter according to claim 5, wherein the adhesive mass comprises an inorganic mixture which can be melted.

9. An adsorption filter according to claim 1, wherein the adsorber particles have a size of about 0.1 to 0.2 mm.

10. An adsorption filter according to claim 1, wherein the adsorber particles are present in an amount of about 50 to 300 g/l of the filter material.

11. An adsorption filter according to claim 1, wherein the adsorber particles comprise activated charcoal.

12. An adsorption filter according to claim 11, wherein the activated charcoal particles have an internal surface of about 600 to 2000 $m^2/g$.

13. An adsorption filter according to claim 1, wherein the adsorber particles are pressure-resistant.

14. An adsorption filter according to claim 1, wherein the adsorber particles are impregnated with metal compounds.

15. An adsorption filter according to claim 1, wherein the adsorber particles contain encapsulated enzymes.

16. An adsorption filter according claim 1, wherein the carrier framework is plastic.

17. An adsorption filter according to claim 16, wherein the carrier framework is a large-pore reticulated polyurethane foam.

18. An adsorption filter according to claim 17, wherein the large-pore reticulated polyurethane foam weighs about 20 to 60 grams per liter and has pores with a diameter of about 1.5 to 3 mm.

19. An adsorption filter according to claim 1, wherein the carrier framework is formed of wire netting or wire mesh superimposed in layers.

20. An adsorption filter according to claim 1, wherein the carrier framework is composed of plastic or wire spirals with a length from about 1 to 10 times their diameter.

21. An adsorption filter according to claim 1, wherein the carrier structure is formed of wires or monofilaments with a length of about 2 to 10 mm, which are held by twisted metal or plastic wires and project perpendicular from this axis in the shape of a spiral staircase.

22. An adsorption filter according to claim 1, wherein the carrier structure is formed of fiber brushes which radiate out from a center point, with a length of about 2 to 10 mm.

23. An adsorption filter according to claim, wherein 1 the carrier structures are connected with one another by heterophilic fibers or threads of hot-melt glue.

24. An adsorption filter according to claim 1, exhibiting a pressure drop of less than 10 mm water column at an air flow of one liter per second for a filter layer of 4 cm and a circular cross-section of 100 $cm^2$.

* * * * *